United States Patent [19]

Abbing et al.

[11] Patent Number: 4,882,976

[45] Date of Patent: Nov. 28, 1989

[54] BRAKE BOOSTER

[75] Inventors: Andreas Abbing, Ludwigsburg; Hannes Bertling, Vaihingen/Enz; George Kehl, Stuttgart; Robert Mergenthaler, Markgroningen; Dietmar Rischen, Korntal-Munchingen; Ernst-Dieter Schäfer, Pliezhausen; Edgar Schmitt, Vaihingen/Enz; Heinz Siegel, Stuttgart, all of Fed. Rep. of Germany

[73] Assignee: Robert Bosch GmbH, Stuttgart, Fed. Rep. of Germany

[21] Appl. No.: 189,893

[22] Filed: May 3, 1988

[30] Foreign Application Priority Data

May 9, 1987 [DE] Fed. Rep. of Germany ....... 3715564

[51] Int. Cl.$^4$ .............................................. F15B 9/10
[52] U.S. Cl. ................................................. 91/376 R
[58] Field of Search ................. 91/376 R, 374, 378; 60/547.1

[56] References Cited

U.S. PATENT DOCUMENTS

2,404,512  7/1946  May et al. ........................ 91/374
2,544,042  3/1951  Pontius, III ..................... 91/376 X
2,698,205  12/1954  Gagen .
2,761,427  9/1956  Shumaker ........................ 91/376 X
3,596,564  8/1971  Johnson ......................... 91/376 R
3,691,903  9/1972  Shellhause ..................... 91/376 R
4,309,934  1/1982  Volkmar et al. ................. 91/376 X Primary Examiner—Edward K. Look
Attorney, Agent, or Firm—Edwin E. Greigg

[57] ABSTRACT

A brake booster in which a servo piston is slidably supported in a housing. The transmission of a brake force is effected via a piston rod protruding into the housing, and a work chamber is formed between the piston rod and the servo piston. After the opening of a valve, this work chamber can be filled with brake fluid from a reservoir or supply container via a pump or the like. A return line also leads out of the work chamber back to the supply container, via a further valve. To improve the closing or sealing behavior of the valves, the first valve is to be embodied for admitting the brake fluid from a valve cone, or its shoulder, the valve cone extending axially in a blind bore of the servo piston, and a valve seat formed out of a valve bushing. The second valve is likewise embodied as a seat valve, and an element connected with the valve cone cooperates with an element connected with the piston rod.

29 Claims, 9 Drawing Sheets

BRAKE BOOSTER

BACKGROUND OF THE INVENTION

The invention relates to improvements in vehicle brake boosters. This application is being filed concurrently with Ser. No. 189,872, now U.S. Pat. No. 4,850,262, for related subject matter, further identified by R. 21203. Brake boosters are typically incorporated between the brake pedal to be actuated and the master brake cylinder; after actuation of the brake pedal, brake boosters generate a brake pressure independently of the pedal braking force exerted. To this end, after brief actuation of the brake pedal, a connection of a work chamber to a reservoir or supply container is opened, and brake fluid is fed out of the reservoir or the supply container into the work chamber, for example via a pump. The expanding work chamber actuates a servo piston under pressure, and this piston transfers the pressure to the master brake cylinder, thereby boosting the brake pressure.

Once the brake pressure is reduced again, a return flow line for the brake fluid located in the work chamber must be provided, so that the servo piston can be relieved as well. This interplay between the opening and closing of the inflow of brake fluid to the work chamber and the control of its return flow plays a considerable role in the braking operation. Because of the many seals that are used to prevent leakage due to the brake fluid movement, the danger of leakage is very great. Also, pressure jumps, which feel unpleasant to the driver, frequently occur when the inflow and return lines close.

OBJECT AND SUMMARY OF THE INVENTION

Contrarily, it is a principal object of the invention to provide a brake booster using seat valves which control the travel of the servo piston. A first valve, for admitting the brake fluid, is formed by a valve cone extending axially in a blind bore of the servo piston, or by the shoulder of this cone, and a valve seat formed out of a valve bushing. This valve serves as the inlet valve for the brake fluid. For permitting flow of the brake fluid out of the work chamber, a second seat valve is provided; the second seat valve comprises an element that is connected to the valve cone of the first seat valve and cooperates with an element connected to the piston rod acted upon by the brake pedal. The first element includes the valve seat, while the second element includes the closure element that fits into the valve seat.

By means of this invention, the actual valves for the inlet or outlet of the brake fluid are disposed separately from the servo piston, the piston rod or corresponding guide bushings, so that the sealing action of the valves does not depend for instance on sealing rings, which are subject to wear, for the servo piston, piston rod or guide bushings. Thus, these elements need only a minimum of seals that are moved along with them, and this in turn reduces the friction of the moving parts and makes for less hysteresis and hence a more-sensitive valve. Moreover, these seat valves are pressure-balanced valves, for which the actuation forces are low and which therefore do not cause any jumps in pressure.

The first valve preferably partitions off a chamber, between the valve cone and the servo piston, which communicates with the reservoir or supply container via a radial bore, an annular chamber formed between the servo piston and the housing, and an inlet bore. The fluid required for the pressure buildup is thus available in greater quantity upstream of the first seat valve, so that when the seat valve opens, the work chamber can immediately be filled sufficiently full.

In the chamber, the valve cone is provided with a collar, which is guided with radial play in the valve bushing or with respect to a blind bore. On the other side of the valve, a compression spring rests at one end on this collar, while on its other end the compression spring is supported by a pressure element that surrounds the valve cone. The valve bushing itself strikes a snap ring after the valve in the blind bore. If only a slight brake pressure is exerted in this arrangement, then only a small amount of brake fluid flows into the work chamber, doing so over the entire length of the travel of the brake pedal or piston rod, since the pressure buildup in the work chamber pushes the servo piston along with it, so that the valve throughput remains unchanged. If the brake pressure is reduced, then the valve closes independently of the travel already covered; similarly, it can be opened wider, regardless of the travel covered, by increasing the brake pressure. The radial play of the collar makes the valve cone movable relative to its longitudinal axis, so that centering of the valve seat can occur at any time with the corresponding shoulder of the valve cone.

The second valve is also embodied as a seat valve and in a first exemplary embodiment it opens up an outlet from the work chamber to an axial bore in the valve cone, by means of which the brake fluid can be returned from the work chamber to the supply container, optionally via a bottom chamber, an inclined bore and a line. In a further exemplary embodiment, the second valve opens up an outlet out of the work chamber to a longitudinal bore in the piston rod, which then communicates with the supply container via a connecting bore, an annular chamber and a radial bore. This embodiment should be used only in the event that an intermediate piston, or an extension that is connected to the piston rod, is provided.

In accordance with the invention, there is also a provision for enlarging the work chamber by allowing the brake fluid to flow downstream of the servo piston via connecting conduits or the like. As a result, the action of the pressure upon the servo piston is substantially better. The connection can also be interrupted, if desired, by means of a ring on the piston rod. This ring has a stop on a snap ring surrounding the piston rod and can be guided between two further snap rings in the servo piston. The connecting conduits can then be used for possible dissassembly of the first snap ring in the blind bore.

Several possible embodiments of the second seat valve are available and are within the scope of the invention; these are as follows:

In one exemplary embodiment, the valve cone penetrates the valve bushing with a top piece on which a valve ring, which has the valve seat, is fixed. This valve top or valve seat is then assigned a bushing, which is seated on the piston rod and has a beveled end face that fits into the valve seat. The top piece and the valve cone need not be integrally embodied, however; instead, the top piece can be embodied as a separate piston with a piston neck that is insertable into the valve cone. The insertion can be effected for instance by screw threading in of the piston neck, or by embodying the piston neck as a flanged-over sheath.

Naturally it is also within the scope of the invention for the valve ring to rest firmly on the bushing connected to the piston rod and form a seat for the top piece connected to the valve cone.

In another embodiment of the invention, a ball fixed on a ball pin is connected to the valve cone. This facilitates centering of the seat or closing elements of the valve, as does another embodiment in which the ball pin is pivotably connected to the valve via a flanged-over portion. The valve cone can additionally have a spherical extension with which the ball is pivotably connected via an interposed sheath. All these provisions serve to improve centering of the second seat valve.

The opposed element of the second seat valve can now be embodied as a bushing, which is seated in a top bore in the piston rod on a support body and optionally on shims. The bushing is guided with radial play in the top bore, so that it, too, contributes to better centering of the valve.

It may also be possible, however, for the piston rod to be topped with a cap, which forms the valve seat.

In the exemplary embodiment in which the brake fluid return line leads from the work chamber through the piston rod to the supply container, this provision has been found to have the disadvantage of increasing the structural length. To reduce this length, the return line is disposed in an intermediate piston, as mentioned above. In that case, this intermediate piston also acts as the valve seat, which cooperates with the corresponding closing element on the valve cone. Nevertheless, this intermediate piston has the disadvantage of increased engineering cost over the exemplary embodiments described thus far, and it also needs to be equipped with additional dynamic seals, leading to increased friction, which must be overcome with increased actuation forces.

In one exemplary embodiment, the intermediate piston can rest with a ball head in a receiving shell in the piston rod. In another exemplary embodiment, the intermediate piston has a dome, which rests on a plate retained in flanged-over fashion by the piston rod. Instead of the pivotable connection of the intermediate piston with the piston rod, this intermediate piston can also be formed as an extension of the piston rod.

The diameter ratios of the elements also play a large role in the brake booster according to the present invention. Normally the diameter of the valve cone, at the point where it is guided into the blind bore in which it slides, is approximately equal to the diameter of the valve seats of the seat valves. In this case, the valve is completely pressure-balanced, so that when the valves are actuated, only the force of the helical spring in the chamber must be overcome. The seal diameter of the bushing seated in the piston rod is slightly greater than the valve seat diameter of the second seat valve. On the other hand, the seal diameter of the bushing seated in the piston rod is slightly greater than the valve seat diameter of the second seat valve. The result, upon servo pressure buildup in the work chamber, is a retaining force that presses the bushing against the piston rod. A restoring spring becomes unnecessary.

The servo piston can also have a different diameter. If the diameter of the servo piston after the annular chamber is greater than the diameter before the annular chamber, the result is a differential surface area acted upon by the reservoir pressure. A restoring force is thus generated as a substitute for a spring force. The ratio of the individual valve seat diameters to one another also plays a role. For instance, if the diameter of the second valve seat is less than the diameter of the first valve seat, then it is possible to insert the valve cone with its top piece into the face-end bore in the valve bushing. Only in that case can the valve cone and top piece be embodied in one piece. The effect of the different diameter of the valve seats, however, is that upon pressure buildup the second valve could no longer be balanced. The valve cone must therefore be embodied in stepped fashion on the far side of the valve seats, in the guidance in the servo piston, thus forming an annular chamber. The valve cone then changes from a diameter equivalent to the diameter of the first seat valve to a diameter equivalent to the second seat valve. This annular chamber then communicates with the work chamber via a supply line.

To return to a way of facilitating the centering, the valve cone can be embodied in two parts, with a pivot point located in between them.

Overall, these seat valves according to the invention have considerable advantages in terms of the seating and sealing behavior of the brake booster. Their simple design makes the entire apparatus very favorable in cost. Secure closing at low actuation forces is still assured.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
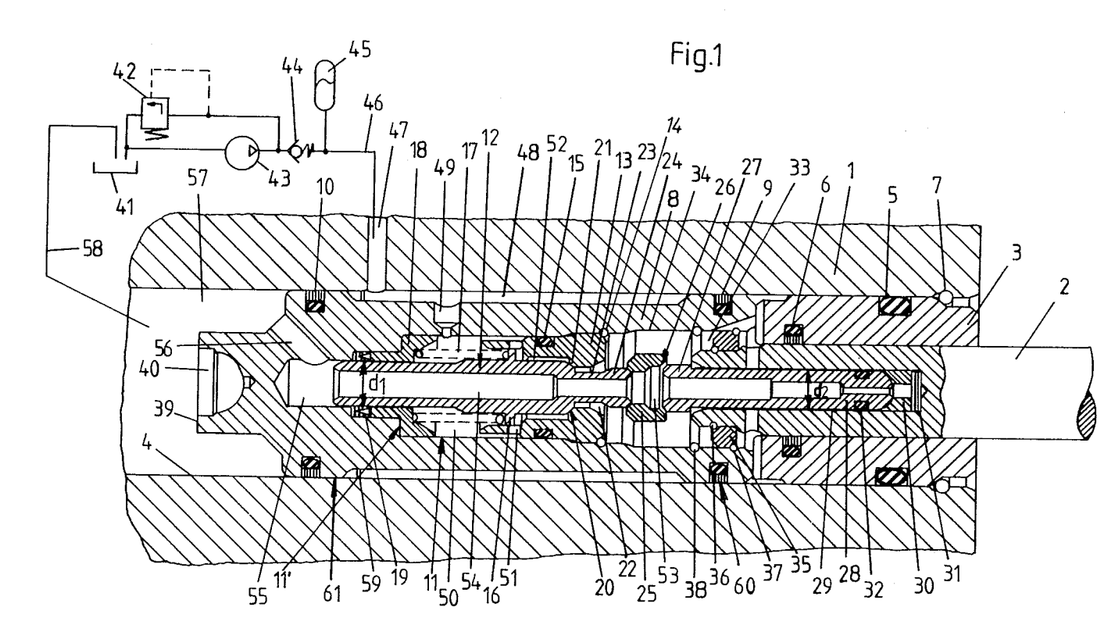
FIG. 1 is a fragmentary longitudinal section through a master brake cylinder housing in the vicinity of a brake booster.

As shown in FIG. 1, a brake booster is mounted in a housing 1, for example of a master brake cylinder. A piston rod 2 protrudes into a guide bushing 3 on the face end of the housing 1, and a brake pedal, not shown in detail, is pivotably connected to the cut-off end of the piston rod. The piston rod 2 is supported via the guide bushing 3 which is supported against the inner wall 4 of the housing; a static seal 5 surrounds the bushing 3 and provides a seal with the inner wall 4, and a dynamic seal 6 is provided in a annular groove in the bushing and provides a seal with the piston rod 2. The guide bushing 3 is also retained axially in the housing 1 by a snap ring 7 near the face end of the housing.

A servo piston 8 is slidingly supported in the housing 1, engages the inner end of the guide bushing 3 and has two dynamic seals 9 and 10 at opposite ends surrounding the outer surface toward the inner housing wall 4.

The servo piston 8 has a stepped axial blind bore 11, which receives the actual brake valve. The innermost portion of this brake valve is embodied by a valve cone 12, which is retained in the blind bore 11 by a valve bushing 13 which is held in place on one end against a snap ring 14. Toward the blind bore 11, the valve bushing 13 is equipped with an O-ring seal 15.

The valve cone 12 also has a collar 16, which is engaged by one end of a compression spring 17 that is supported on its other end on a support element 18 surrounding the valve cone 12. This support element 18 in turn engages a shoulder 11' provided in the blind bore 11 and secures a lip seal 19 in the axial direction relative to the valve cone.

Toward the valve cone 12, the valve bushing 13 forms a shell-shaped valve seat 20, in which a rounded shoulder 21 of the valve cone 12 is seated in the closing position of the valve. Following the valve seat 20 in the valve bushing 13 is a face-end bore 22, through which a neck portion 23 of the valve cone 12 engagingly passes. Following that, a larger end piece 24 is formed onto the neck portion 23. This larger end piece 24 engages a valve ring 25 and these elements are welded to one another.

The valve ring 25 forms a second valve seat 26 on its face end, which is capable of receiving a valve head 27 of a bushing 28. This bushing 28 is inserted axially into a blind bore 29 of the piston rod 2, where it meets a support element 30 undergirded by shims 31. Toward the blind bore 29, a seal 32 surrounds the bushing 28.

The larger end piece 24 of the valve cone 12, valve ring 25, valve head 27 and a portion of the piston rod 2 rest in a work chamber 33, which is formed by the servo piston 8 between the valve bushing 13 and the guide bushing 3. The inner end of the piston rod 2 is supported via a ring 35 which is supported against the inner wall 34 of the work chamber 33 and retained between a snap ring 36 on the piston rod 2 and a snap ring 37 on the servo piston 8. A further snap ring 38 in the inner wall 34 of the servo piston 8 limits the stroke between the piston rod 2 and the servo piston 8, and in the event of servo failure, for instance, directly transmits the brake force acting upon the piston rod 2.

A ball recess 40 is formed into a free end face 39 of the servo piston 8 and receives therein a bolt, not shown in further detail, which is braced between the master brake cylinder, not shown, and the servo piston, the bolt moves the master brake cylinder when force is exerted upon the servo piston 8.

FIG. 1 schematically shows a brake fluid supply container 41 that communicates with a pump 43. By means of the pump 43, a reservoir 45 can be filled via a one-way check valve 44 between the pump and the reservoir. A pressure limiting valve 42 prevents a pressure overload. A line 46 leads from the reservoir 45 or pump 43 to an inlet bore 47 in the housing 1. This bore discharges into an annular chamber 48 between a reduced section of the servo piston 8 and the housing 1. From the annular chamber 48, a radial bore 49 leads into a chamber 50, formed between the servo piston 8 and the valve cone 12, the valve bushing 13 and the support element 18 in which the compression spring 17 is also supported. The chamber 50 communicates via bores 51, an annular chamber 52 between the valve cone 12 and the valve bushing 13, and the face-end bore 22 with the work chamber 33, a communication that can be interrupted from the valve seat 22 between the annular chamber 52 and the face-end bore 22.

By lifting the valve head 27 from the valve seat 26 of the valve ring 25, an outflow from the work chamber 33 into axial bores 53 of the valve ring 25 and bore 54 of the valve cone 12 is formed. The axial bore 54 discharges into a bottom chamber 55 of the servo piston 8, which communicates via an inclined bore 56 with a housing chamber 57 between the master cylinder and the servo piston 8. From this housing chamber 57, via further bores, not shown, a line 58 leads back to the supply container 41.

For secure centering of the brake valve, the valve cone 12 is supported with radial play between the collar 16 and the valve bushing 13, and thus enables secure centering of the rounded shoulder 21 in the valve seat 20. The bushing 28 likewise has a radial play in the piston rod 2 following the seal 32, for the sake of better centering of the valve head 27 in the valve seat 26. The seal 32 is embodied as a remote pivot point, so that the centering is unhindered.

The outer diameter $d_1$ of the valve cone 12 is equivalent to the diameter of the valve seats 20 and 26. The valve is thus completely pressure-balanced. Upon actuation of the valve, only the force of the compression spring 17 and the seal friction need to be overcome.

The outer diameter $d_2$ of the bushing 28 is slightly larger than the diameter of the valve seat 26. As a result, upon servo pressure buildup in the work chamber 33, a retaining force is produced that presses the bushing 28 against the support body 30. This makes a restoring spring unnecessary.

The mode of operation of the brake valve, shown here, in the brake booster is as follows:

In the position of repose, that is, outside of a braking event, the annular chamber 52 is subject, via the bores 51, the chamber 50, the annular chamber 48, the inlet bore 47 and the line 46, to the pressure of the brake fluid from the reservoir 45. Any further flow of the brake fluid is blocked by the valve seat 20 and the lip seal 19. The compression spring 17 keeps the rounded shoulder 21 of the valve cone 12 in contact with the valve seat 20.

The work chamber 33 communicates with the supply container 41 via the open valve seat 26 and the axial bores 53 and 54, the bottom chamber 55, the inclined bore 56, the housing chamber 57 and the line 58 and is thus free of pressure.

If the brake pedal (not shown) is now actuated, to initiate a braking event, the piston rod 2 is displaced to the left, whereupon the valve head 27 guided by the piston rod 2 meets the valve seat 26, closing off the return flow from the work chamber 33 to the supply container 41. Then the valve cone 12 is also subjected with brake force via the valve ring 26 and is guided counter to the force of the compression spring 17. The rounded shoulder 21 now lifts from its valve seat 20, so that fluid present in the annular chamber 52 can flow into the work chamber 33 and build up a servo pressure there. This servo pressure, via the valve bushing 13, effects a followup of the servo piston 8 until the valve seat 20 is again resting on the rounded shoulder 21. The valve formed by the valve seat 26 and the valve head 27 remains closed. The servo pressure also has a feedback effect on the piston rod 2 and on the brake pedal.

If the force on the pedal is reduced, the valve head 27 lifts from the valve seat 26, while the valve formed by the valve seat 20 and the rounded shoulder 21 remain closed. As a result, the fluid located in the work chamber 33 can flow back into the supply container 41, cancelling the servo pressure in the work chamber 33. The servo piston 8 itself, under the pressure of the master brake piston, not shown in detail, is returned, so that it follows up the piston rod 2. The valve seat 26 can now rest on the valve head 27 again in the intermediate phase and prevent an outflow of servo fluid from the work chamber 33. Only in the final position is the valve head 27 still lifted away from the valve seat 26.

It should also be noted that with the formation of an annular shoulder 59 in the inner wall 4, the diameter at the point 60 of the servo piston 8 is slightly larger than the diameter at the point 61. The result is a differential surface area acted upon by the pressure of the reservoir 45. As a result, a restoring force for the servo piston is brought about, as a substitute for a spring force.

Figures 2, 3:
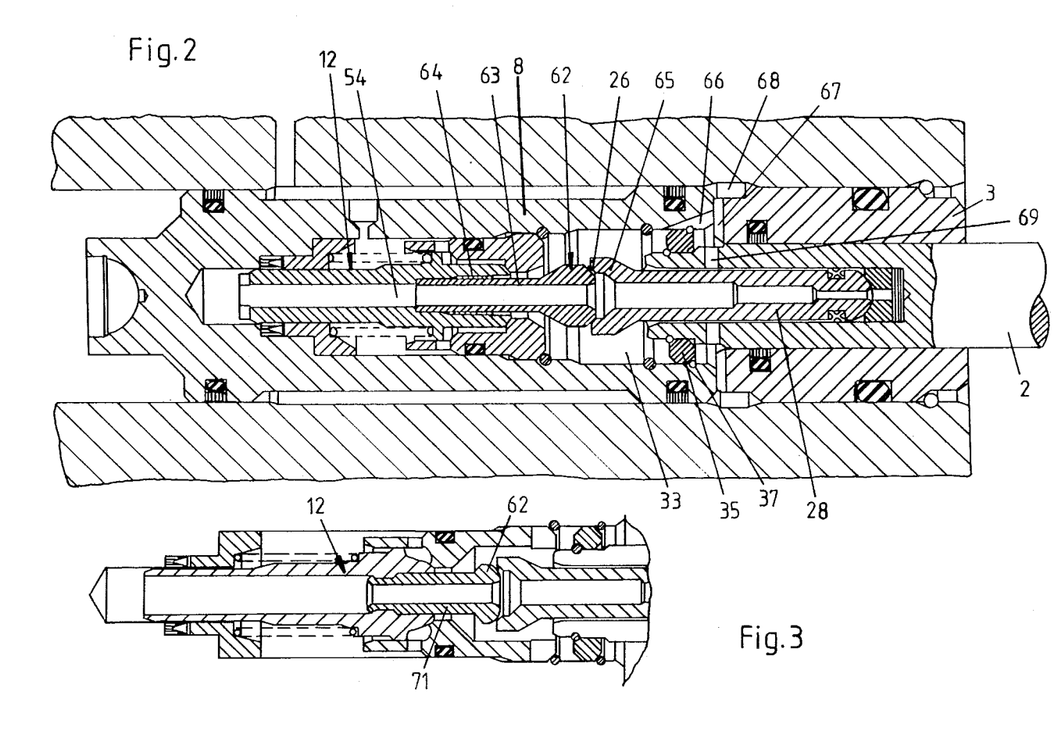
FIG. 2 is a longitudinal section through another embodiment of a master brake cylinder in the vicinity of the brake booster.
FIG. 3 is a detail of FIG. 2 for a further embodiment.

FIG. 2 shows an exemplary embodiment of the invention that is similar to that of FIG. 1. Identical components are accordingly identified by the same reference numerals and will not be described again.

However, in this embodiment the valve ring 25 shown in FIG. 1 is embodied as a piston 62, which with a piston neck 63 is screwed via an external thread 64 into the axial bore 54 of the valve cone 12. This embodiment also lacks the neck portion 23 and the enlarged end 24 of the valve cone 12 of FIG. 1.

Another difference is that here the valve seat 26 is formed by a mouthpiece 65 of the bushing 28, the piston 62 resting on the valve seat 26 in the closing position.

It is also shown in this exemplary embodiment that the work chamber 33 communicates via connecting conduits 66, 67 with an annular chamber 68 and a radial bore 69. Via this connection, pressure fluid can be introduced between the servo piston 8 and the guide bushing 3, so that the pressure fluid can act upon the servo piston 8. The conduit 66 is also used for the possible later removal of the snap ring 37.

In FIG. 3, the piston 62 of FIG. 2 is embodied as a flanged-over sheath 71, so that an external thread meshing with internal teeth is dispensed with on the flanged-over sheath. Otherwise, the exemplary embodiment of FIG. 3 is equivalent to that of FIG. 2.

Figure 4:
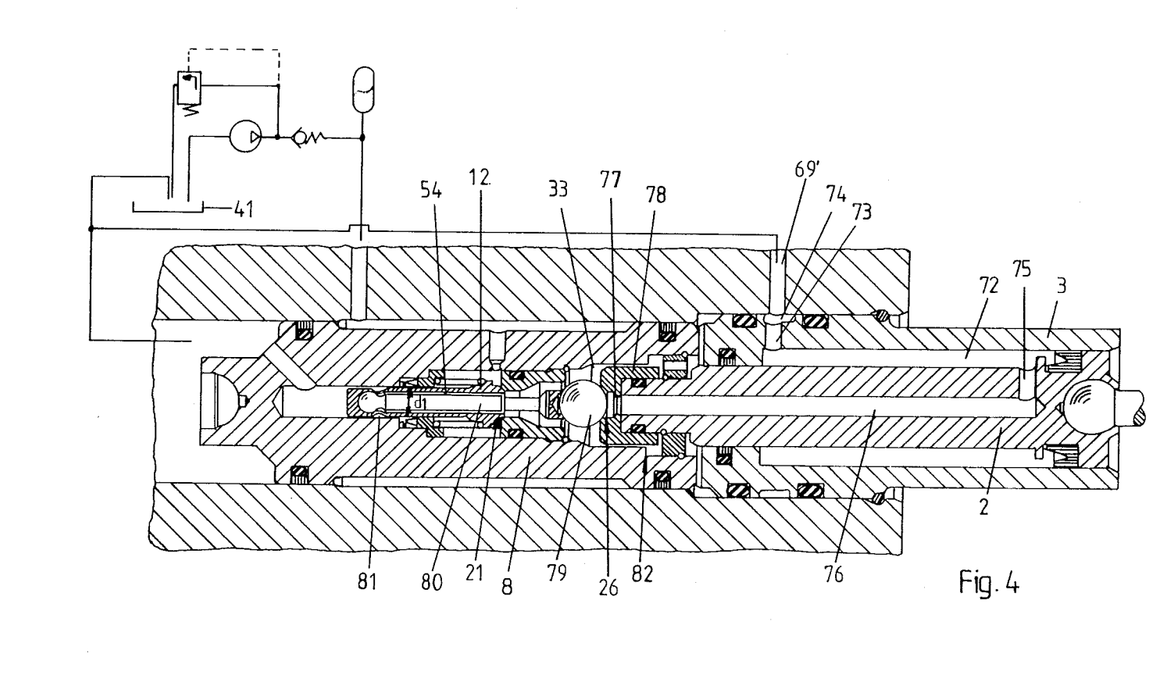
FIGS. 4-7 are fragmentary longitudinal sections through a master brake cylinder in the vicinity of the brake booster in further embodiments.

The exemplary embodiment of the brake booster shown in FIG. 4 is likewise largely identical to the exemplary embodiment shown in FIGS. 1 and 2. Only the elements that are different, and their function, will therefore be described below.

Between the piston rod 2, which is embodied as a stepped piston, and the guide bushing 3 surrounding it, an annular chamber 72 is formed.

This annular chamber 72 communicates via a bore 73, a compensation chamber 74 and the radial bore 69 with the supply container 41. Also provided is a connecting bore 75 to a longitudinal bore 76 in the piston rod 2, which discharges into a face-end bore 77 of a cap 78 topping the piston rod 2 in the work chamber 33. A chamfer, opening toward the outside, of the face-end bore 77 forms the valve seat 26, which can be closed by a ball 79. This ball 79 is welded onto a ball pin 80, which penetrates the axial bore 54 of the valve cone 12 and is rotatably connected at the end with the valve cone 12 by means of a flanged-over portion 81. The ball 79 is thus once again easily centered on the valve seat 26.

With its rounded shoulder 21, the valve cone 12 blocks off the reservoir pressure in the manner described above. The seat diameter and the outside diameter $d_1$ of the valve cone 12 are again of equal size, so that the valve is completely pressure-balanced. The stroke limitation of the movement of the piston rod 2 in the servo piston 8 is effected at the shoulder 82.

In this embodiment, the return line of the brake fluid accordingly leads out of the work chamber 33 via the longitudinal bore 76 and the connecting bore 75 in the piston rod 2, the annular chamber 72, the bore 73, the compensation chamber 74 and the radial bore 69 to the supply container 41.

Figure 5:
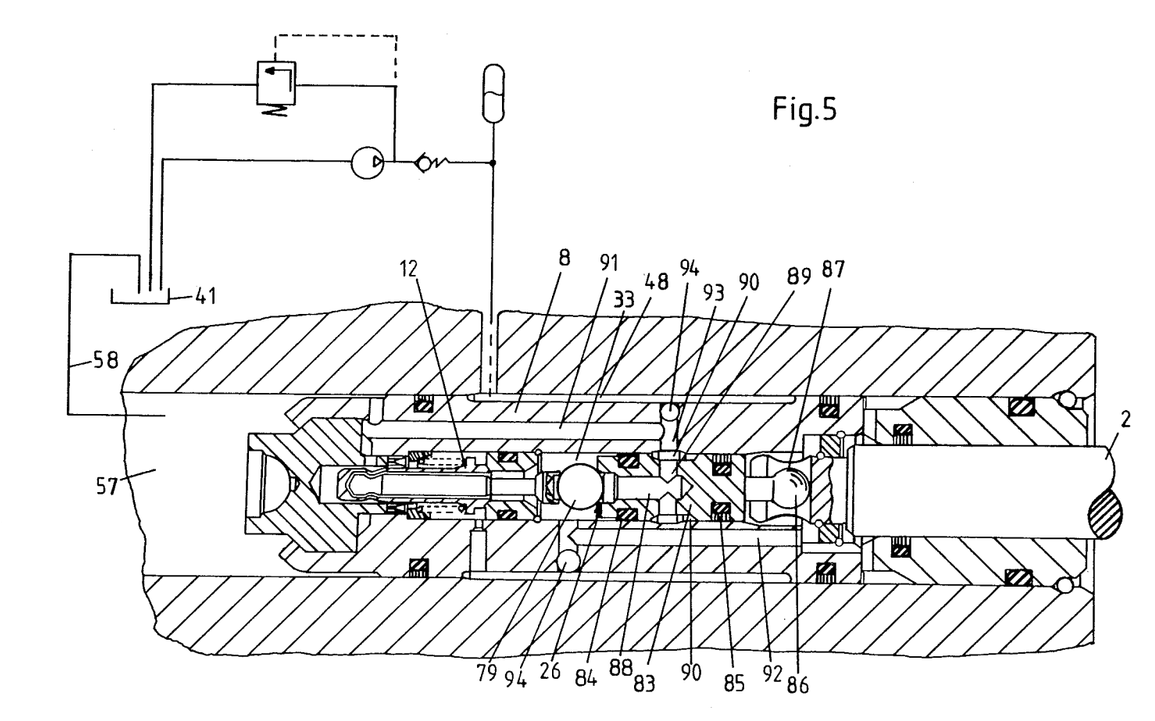

In the exemplary embodiment of FIG. 5, the return line out of the work chamber 33 to the supply container 41 is provided neither in the valve cone 12 nor in the piston rod 2. The return flow here takes place via an intermediate piston 83, which as far as the valve seat 26 is concerned replaces the bushing 28 or cap 78. The ball 79 described in conjunction with FIG. 4 fits into the valve seat 26.

The intermediate piston 83 is slidably supported in the servo piston 8 via two dynamic seals 84 and 85 and with a ball head 86 engaging a correspondingly shaped receiving shell 87 in the piston rod 2.

Cross bores 89 branch off from a longitudinal bore 88 that follows the valve seat 26. These cross bores discharge into an annular chamber 90 that surrounds the intermediate piston 83 and communicates via a further longitudinal bore 91 in the servo piston with the housing chamber 57, where it communicates with the line 58 to the supply container 41.

The servo pressure from the work chamber 33 is carried, upon pressure buildup, via an axially parallel line 92 to the other side of the intermediate piston 83 as well, so that here the servo pressure can again act directly upon the piston rod 2.

The bore 93 connecting the longitudinal bore 91 and longitudinal bore 92 with the annular chamber 90 and the work chamber 33, respectively, extends as far as the annular chamber 48, but is closed off from the annular chamber 48 by a respective closing cone 94.

Figure 6:
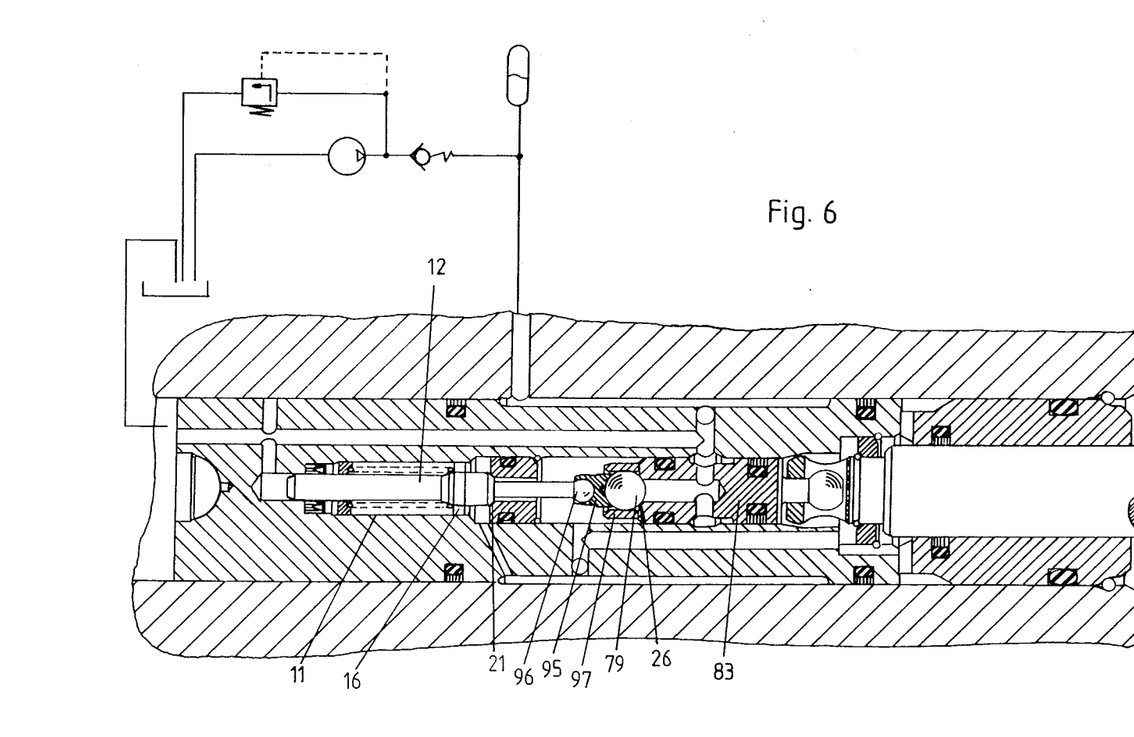

The exemplary embodiment of FIG. 6 is a continuation of the exemplary embodiment of FIG. 5 having an intermediate piston 83. This piston again forms a valve seat 26, which cooperates with the ball 79. The ball 79 is welded to a sheath 95, which is pivotably flanged to a spherical extension 96 of the valve cone 12. The ball 79 can thus once again be easily centered on the valve seat 26. Furthermore, the collar 16 on the valve cone 12 is again guided with radial play in the blind bore 11, to facilitate the centering of the rounded shoulder 21 and ball 79.

A sheath 97 encompassing the valve seat 26 also serves to center the ball 79.

Figure 7:
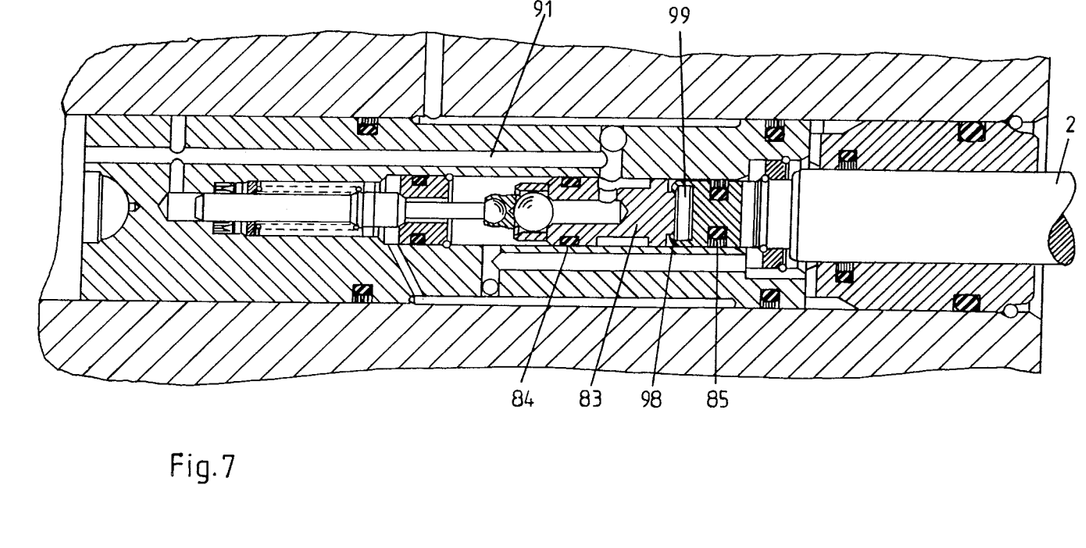

In FIG. 7, an embodiment of the brake booster of FIG. 6 is shown, in which the connection between the intermediate piston 83 and the piston rod 2 is embodied differently. Toward the piston rod 2, the intermediate piston 83 has a dome 98, which is supported on a plate 99. For retention of the plate 99, this plate is flanged to the piston rod 2.

The intermediate piston 83 here has only one dynamic seal 84, while the other dynamic seal 85 is disposed directly in the piston rod 2. Only the pressure of the brake fluid returning via the longitudinal bore 91 acts in between the two seals.

Figure 8:
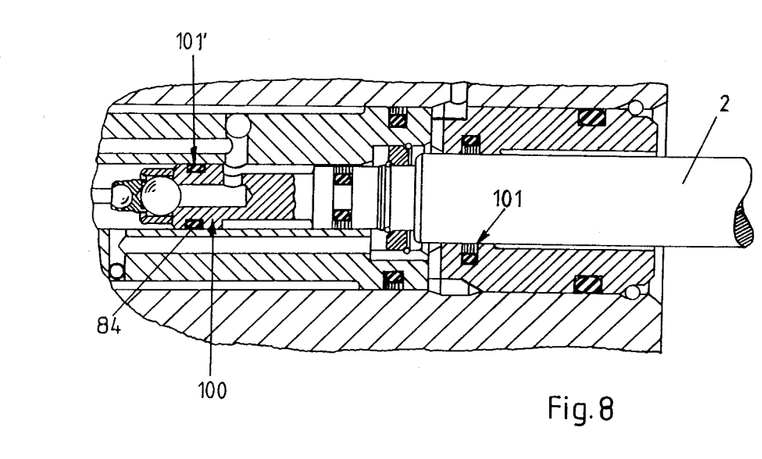
FIG. 8 is a detail of FIG. 7 for a further embodiment.

In FIG. 8, there is no pivotable connection at all between the intermediate piston 83 and the piston rod 2; instead, the intermediate piston 83, in the form of an extension 100, is formed onto the piston rod 2 itself. The guidance of this piston rod 2 is effected via a guide face 101 on the guide bushing 3 and via the guide face 101' on the extension 100.

Figure 9:
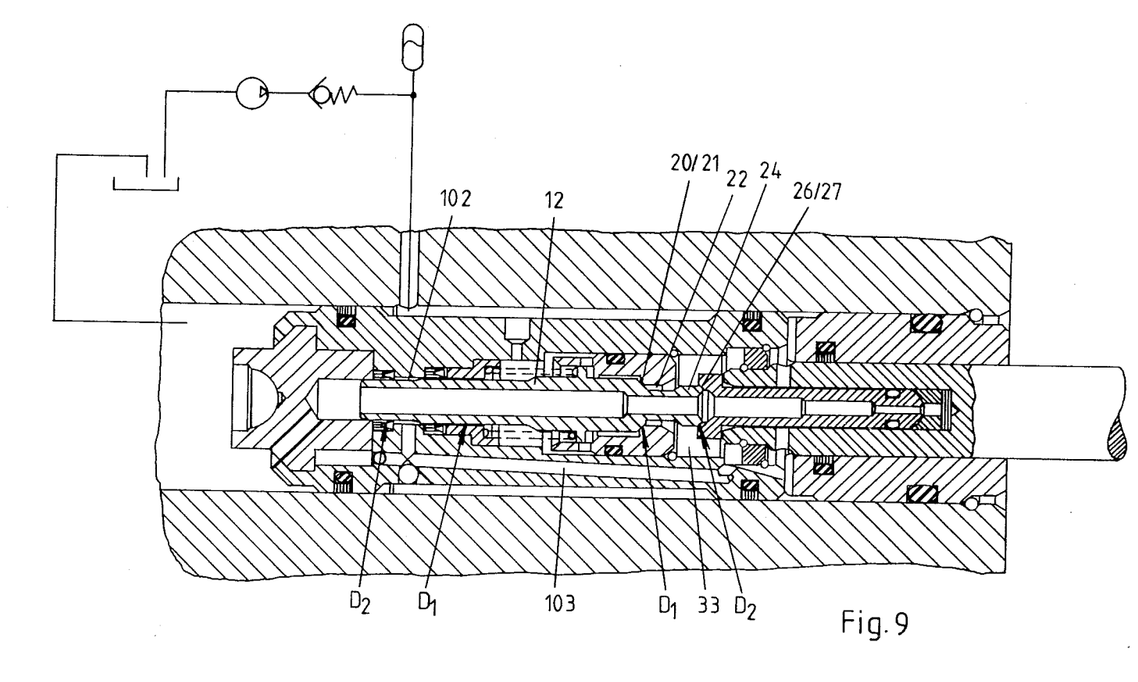
FIG. 9 is a fragmentary longitudinal section through a master brake cylinder in the vicinity of the brake booster.

The embodiment of the brake booster of FIG. 9 is again more like that of FIGS. 1 and 2. Since in the embodiment of FIG. 1 the diameter $d_1$ was approximately equal to the valve seat diameters, the valve ring 25 had to be firmly joined to the valve cone 12 by welding, with screws, or by flanging. In the embodiment of FIG. 9, this is unnecessary, since here the valve seat 26 is smaller than the valve seat 20. This is due to the fact that the larger end of the valve cone 24 has a reduced diameter so that it can be inserted through the face-end bore 22. Upon pressure buildup, however, the pressure valve formed by the valve seat 20 and the shoulder 21 would no longer be balanced. A corresponding stepup from a diameter $D_1$ equivalent to the diameter of the valve 20/21 to a diameter equivalent to the diameter $D_2$ of the valve 26/27 must therefore be provide on the opposite side of the valve cone 12. The annular chamber 102 created in between can be acted upon via the supply line 103 by servo pressure from the work chamber 33.

Figure 10:
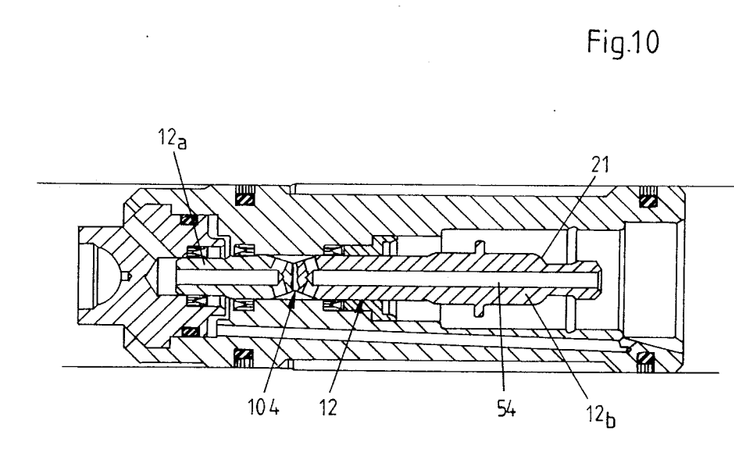
FIG. 10 is a detail of FIG. 9 for another embodiment.

According to FIG. 10, a division of the valve cone 12 is effected, but then its axial bore 54 extends past the pivot point 104. One part 12a of the valve cone 12 can then have a dome, which is placed atop the other part 12b of the valve cone 12, thus forming a joint. This makes it easy to center the rounded shoulder 21 in the valve seat associated with it.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake booster in a housing for a master cylinder which comprises a guide bushing (3) in a face end of said housing, a piston rod (2) supported by said guide bushing protruding into the housing for transmitting a brake force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), a chamber (50) formed between said valve cone (12) and said servo piston (8), said chamber (50) communicates via a radial bore (49), an annular chamber (48) formed between the servo piston (8) and the housing (1), an inlet bore (47) connected with said brake fluid supply, said first valve controls brake fluid flow from said chamber (50) to said work chamber, said valve cone (12) includes a collar (16) thereon within said chamber (50), said collar being guided with radial play in said valve bushing (13), and said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2).

2. A brake booster as defined by claim 1, which includes a compression spring supported on one end by said collar (16) and on its other end on a support element (18) surrounding said valve cone (12).

3. A brake booster as defined by claim 1, in which said valve bushing (13) is held in place by a snap ring (14).

4. A brake booster as defined by claim 1, in which said first valve (20, 21) is juxtaposed with a face-end bore (22) in said valve bushing (13), which bore serves as a through bore to said work chamber (33).

5. A brake booster as defined by claim 1, in which said valve cone at a point where it is guided in said blind bore (11) has an outer diameter ($d_1$) approximately equivalent to the diameter of the valve seat.

6. A brake booster as defined by claim 5, in which a diameter of said servo piston (8) at a first point (61) on one end of said annular chamber (48) is smaller than the diameter at a second point (60) on the opposite end of said annular chamber (48).

7. A brake booster as defined by claim 1, in which said second element is a bushing (28) having an outer diameter ($d_2$) slightly larger than the diameter of a valve seat (26) formed by said first element.

8. A brake booster in a housing for a master cylinder which comprises a guide bushing (3) in a face end of said housing, a piston rod (2) supported by said guide bushing protruding into the housing for transmitting a brake force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), said second valve uncovers an outlet of said work chamber (33) which leads to an axial bore (54) in said valve cone (12) through which bore brake fluid returns from said work chamber (33) to said supply container (41).

9. A brake booster as defined by claim 8, which includes a chamber (50) formed between said valve cone (12) and said servo piston (8), said chamber communicates via a radial bore (49), an annular chamber (48) formed between the servo piston (8) and the housing (1), an inlet bore (47) connected with said brake fluid supply, and said first valve controls brake fluid flow from said chamber to said work chamber.

10. A brake booster as defined by claim 9, in which said valve cone (12) includes a collar (16) thereon within said chamber (50), said collar being guided with radial play in said valve bushing (13).

11. A brake booster as defined by claim 8, in which said work chamber (33) communicates via connecting conduits (66, 67) with an annular chamber (68) and with radial bores (69) for introducing a pressure medium between said guide bushing (3) and said servo piston (8).

12. A brake booster in a housing for a master cylinder which comprises a guide bushing (3) in a face end of said housing, a piston rod (2) supported by said guide bushing protruding into the housing for transmitting a braking force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), and said second valve uncovers an outlet out of said work chamber (33) to a longitudinal bore (76) in said piston rod (2), which bore communicates via a connecting bore (75), an annular chamber (72) and at least one radial bore with said supply container (41).

13. A brake booster in a housing for a master cylinder which comprises a guide bushing (3) in a face end of said housing, a piston rod (2) supported by said guide bushing protruding into the housing for transmitting a braking force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), said second element is a valve seat (26) for said second valve embodied by an intermediate member (83, 100) connected to said piston rod (2), said second element including a longitudinal bore (88) leading from said valve seat (26) to a cross bore (89) which communicates via an annular chamber (90), bores (93) and a longitudinal bore (91) with said supply container (41).

14. A brake booster in a housing for a master cylinder which comprises a guide bushing (3) in a face end of said housing, a piston rod (2) supported by said guide bushing protruding into the housing for transmitting a braking force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), said second valve is formed by a valve ring (25) secured to an enlarged end (24) of said valve cone (12) that extends through said valve bushing (13), and a valve seat (26) is formed on said valve ring for cooperation with a valve head (27) that seats against said valve seat, said valve head being formed on a bushing (28) seated in said piston rod (2).

15. A brake booster in a housing for a master cylinder which comprises a guide bushing (3) in a face end of said housing, a piston rod (2) supported by said guide bushing protruding into the housing for transmitting a braking force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), and one element of said second valve is formed by a piston holder (62) screw threaded into said valve cone (12) on one end of which a bearing piston (62) is formed.

16. A brake booster as defined by claim 15, in which said second element includes a valve seat (26) embodied by a bushing (28) disposed in a blind bore (29) provide in the piston rod (2), which bushing (28) rests on a support element (30).

17. A brake booster as defined by claim 16, in which said valve seat (26) is surrounded by a centering sheath (97).

18. A brake booster as defined by claim 15, in which said piston rod (2) is topped by a cap (78), which forms a valve seat (26).

19. A brake booster as defined by claim 15, in which said second element is a valve seat (26) embodied by an intermediate piston (83) which is pivotably connected to said piston rod (2).

20. A brake booster as defined by claim 19, in which said intermediate piston (83) rests with a ball head (86) in a receiving shell (87) in said piston rod (2).

21. A brake booster as defined by claim 19, in which said intermediate piston (83) rests with a dome (98) on a plate (99), which is retained by the piston rod (2) by being flanged over.

22. A brake booster as defined by claim 15, in which said second element is a valve seat (26) embodied by an extension (100) formed onto the piston rod (2).

23. A brake booster in a housing for a master cylinder which comprises a guide bushing (3) in a face end of said housing, a piston rod (2) supported by said guide bushing protruding into the housing for transmitting a braking force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), and one element of said second valve is formed by a flanged-over sheath (71) inserted in said valve cone (12) on one end of which a piston (62) is formed.

24. A brake booster in a housing for a master cylinder which comprises a guide bushing (3) in a face end of said housing, a piston rod (2) supported by said guide bushing protruding into the housing for transmitting a braking force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), and one element of said second valve includes a ball (79) attached to a ball pin (80) secured to said valve cone (12).

25. A brake booster as defined by claim 24, in which said ball pin (80) is pivotably connected to said valve cone (12) via a flanged portion (81).

26. A brake booster as defined by claim 24, in which said valve cone (12) includes a spherical extension (96), with which said ball (86) is pivotably connected via an interposed sheath (95).

27. A brake booster in a housing for a master cylinder which comprises a guide bushing (3) in a face end of said housing, a piston rod (2) supported by said guide bushing protruding into the housing for transmitting a braking force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), and said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), in which a diameter (D) of a valve seat (26) formed by said first element is smaller than a diameter (D) of said first valve seat (20).

28. A brake booster as defined by claim 27, in which said valve cone (12) includes a stepped profile at one extremity forming an annular chamber (102), the stepping being from a first diameter equivalent to the diameter ($D_1$) down to a second smaller diameter equivalent to the diameter ($D_2$), and the annular chamber (102) communicates via a supply line (103) with said work chamber (33).

29. A brake booster in a housing for a master cylinder which comprises a guide bushing (3) in a face end of said housing, a piston rod (2) supported by said guide bushing protruding into the housing for transmitting a brake force, a servo piston slidably supported in the housing in alignment with said guide bushing, a work chamber provided in said servo piston for receiving brake fluid derived from a brake fluid supply, a first valve that controls brake fluid flow to said work chamber, a second valve that controls fluid flow from said work chamber to a return line to a supply container (41), said first valve for controlling brake fluid flow to said work chamber being embodied by a valve cone (12) operative relative to a first valve seat formed in a valve bushing (13), said valve cone extending axially in a blind bore (11) of said servo piston (8) in axial alignment with said valve bushing (13), said second valve for controlling the outflow of the brake fluid from said work chamber (33) is formed by a first element (24, 25, 62, 71, 79) connected to said valve cone (12) which cooperates with a second element (28, 78, 83, 100) connected to said piston rod (2), and said valve cone (12) is divided into two sections with an interposition of a pivot point (104).

* * * * *